//TK

United States Patent
Woods

[11] 3,810,099
[45] May 7, 1974

[54] MEANS FOR PROVIDING A VEHICLE CONTROL SIGNAL CONTAINING DIRECTION AND SPEED INFORMATION

[75] Inventor: David H. Woods, Ann Arbor, Mich.
[73] Assignee: Westinghouse Electric Corporation, Pittsburgh, Pa.
[22] Filed: Oct. 26, 1972
[21] Appl. No.: 301,011

[52] U.S. Cl. ....... 340/171 R, 340/163 R, 343/225 R
[51] Int. Cl. ............................................. H04q 9/00
[58] Field of Search .................... 340/171 R, 163 R; 343/225 R; 246/34 R

[56] References Cited
UNITED STATES PATENTS
3,339,067  8/1967  Reich .......................... 343/225 UX
3,454,927  7/1969  Dame et al. .................... 343/225 X
3,593,022  7/1971  Hoyler ........................... 340/163 X Primary Examiner—Harold I. Pitts
Attorney, Agent, or Firm—J. M. Arnold

[57] ABSTRACT

A vehicle control system, such as a rubber tired system in which a speed and direction signal is transmitted to a vehicle operational in the system. The speed and direction signal is binary coded and frequency modulated such that the respective frequencies of the binary ONES and ZEROS determine the direction of travel, and the order of the binary ONES and ZEROS determines the speed of the vehicle. If the vehicle is to travel in a forward direction along the vehicle travel path, the binary ONE and ZERO signals are at first and second frequencies respectively, and if the vehicle is to travel in the reverse direction along the vehicle travel path, the binary ONE and ZERO signals are at third and fourth frequencies respectively.

5 Claims, 6 Drawing Figures

MEANS FOR PROVIDING A VEHICLE CONTROL SIGNAL CONTAINING DIRECTION AND SPEED INFORMATION

CROSS-REFERENCE TO RELATED APPLICATIONS

Reference is made to U.S. pat. application Ser. No. 101,333, entitled "A Vehicle Movement Control And Detection Method And Apparatus," filed Dec. 24, 1970 on behalf of Robert H. Perry, which application is assigned to the assignee of the present invention.

BACKGROUND OF THE INVENTION

In any vehicle control system be it steel wheeled or rubber tired, it is necessary that a vehicle operational in the system receive a control signal which is indicative of desired direction of travel and speed of travel. Accordingly, the vehicle must respond correctly to the control signal such that there are no accidents due to incorrect reception of the control signal. In a steel wheel steel rail transit system the vehicle always knows the direction in which it should travel by receiving signals at the front of the vehicle. This is so, because of the steel wheel steel rail arrangement, since the signals received at the front of the vehicle from the wayside are shunted out before they can reach the rear of the vehicle. If for one reason or another the vehicle should operate in a direction contrary to that which the wayside equipment has instructed, the vehicle does in fact receive the signals which are being sent by the wayside equipment to a vehicle behind the vehicle in question, which by definition is a ZERO speed signal. Therefore, the vehicle in question received what is known as its own ZERO speed signal, and as a result stops.

In the case of a rubber tired vehicle system, the train picks up the same signals from the wayside regardless of the direction of travel of the vehicle. It is necessary therefore at all times for the vehicle to be moving in the direction that the wayside equipment directs. In the prior art, the direction and speed information were contained in one binary word, say for example, an 8-bit word in which the first bit is indicative of the direction of travel of the vehicle and the remaining seven bits are indicative of the speed. For example, if the vehicle were to travel in a forward direction, the first bit would be at a binary ONE level, and if the vehicle were to travel in the reverse direction the first bit would be at a binary ZERO level. This type of coding structure, however, is not safe due to the fact that there may be a failure such that the first bit may be of an incorrect binary value such that the vehicle will travel in the incorrect direction.

According to the teachings of the present invention a vehicle control signal is provided which specifies the direction of travel and speed of travel for the vehicle. The control signal is frequency modulated and binary coded, wherein the respective frequencies of the binary ONE and ZERO signals determine the direction of travel of the vehicle, and the order of the binary ONE and ZERO bits determines the speed of travel of the vehicle.

SUMMARY OF THE INVENTION

According to the teachings of the present invention, a system for controlling the speed and direction of travel of a vehicle over a vehicle travel path is disclosed. There are means for providing a direction signal having a first frequency if the direction of travel for the vehicle is to be in a forward direction, and having a second frequency if the direction of travel for the vehicle is to be in a reverse direction. Also included are means for providing a coded speed signal indicative of the desired speed of travel for the vehicle. Further included are means for providing a vehicle control signal coded in a manner indicative of desired direction of travel and speed for the vehicle in response to the provision of the direction signal and the coded speed signal.

DESCRIPTION OF THE PREFERRED EMBODIMENT

Figure 1:
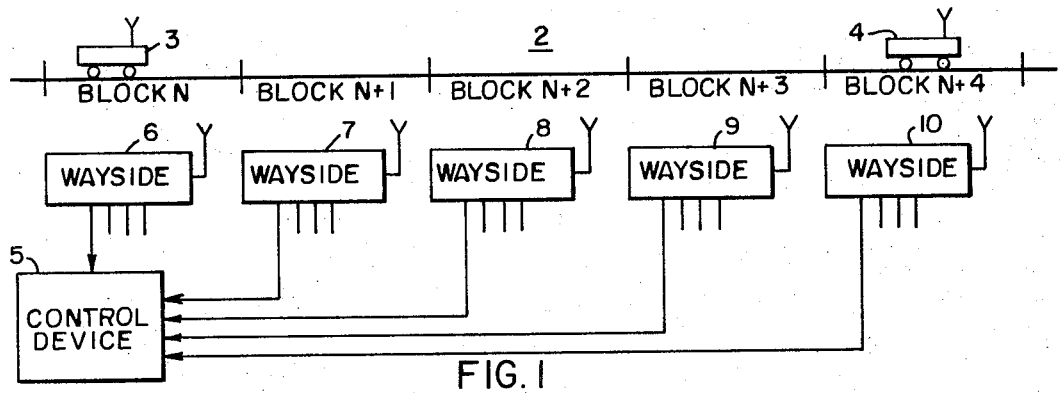
FIG. 1 is a block diagram representation of a rubber tired vehicle control system.

In FIG. 1 there is illustrated a vehicle travel path 2 which is divided into a plurality of vehicle control blocks such as block N, block N+1, and block N+2 through block N+4. It is to be appreciated that any number of vehicle control blocks may be utilized dependent upon the length of the vehicle travel path 2 and the speed at which the vehicles are to travel along the vehicle travel path. Vehicles such as the rubber tired vehicles 3 and 4 travel along the vehicle travel path 2 receiving control signals, which are indicative of the direction of travel and the speed of travel for a given vehicle from control devices on the wayside. One such control device 5 is illustrated in block N. Similar control devices are situated in each of the remaining control blocks but are not illustrated to facilitate the ease of description of system operation. The control device 5 receives signals from wayside vehicle detection circuits, such as the devices 6, 7, 8, 9 and 10. These wayside circuits are well known in the art and one such wayside vehicle detection circuit which may be used in the practice of the present invention is described in the previously referenced patent application Ser. No. 101,333. Signal outputs from each of the wayside circuits are connected to the control device 5. For purposes of description, it is assumed that a signal is transmitted from a given wayside circuit in the event its associated signal block is absent a vehicle, and accordingly, a signal is not transmitted to the control device 5 when there is a vehicle present in the given control block. For the system illustrated, it is seen therefore that a signal is transmitted from the wayside circuits 7, 8 and 9 to the control device 5, whereas the wayside devices 6 and 10 do not transmit a signal to the control device 5. The control device 5 responds to the signal manifestations from the wayside devices and transmits a frequency modulated binary coded control signal to the vehicle 3 commanding the vehicle to travel at a given rate of speed for example 30 miles per hour and in a given direction, for example a forward direction, which is assumed to be from left to right when viewing FIG. 1. The order of the binary bits forming the control signal determines the speed, and the frequency of the binary ONE and ZERO bits determines the direction of travel of the vehicle. That is, when the vehicle is to travel in a forward direction, that is, from left to right, the binary ONES and ZEROS of the coded control signal are at first and second frequencies respectively, and when the vehicle is to travel in a reverse direction, that is, from right to left, the binary ONE and ZERO signals are at third and fourth frequencies respectively. This will be described in detail shortly.

Figure 2:
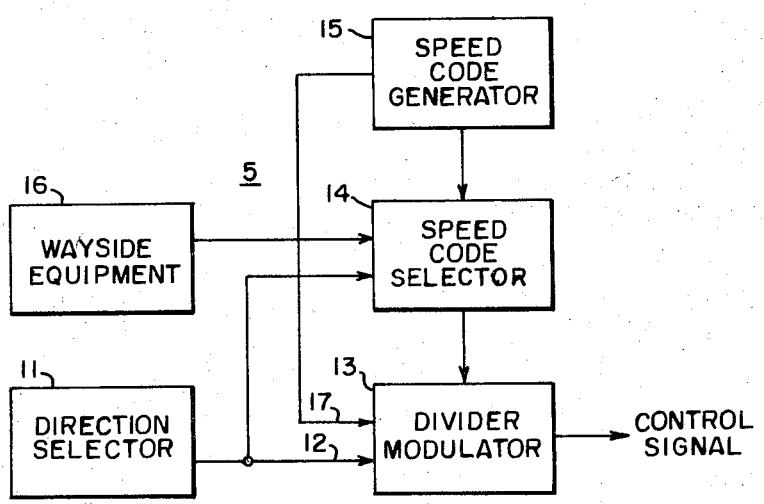
FIG. 2 is a block diagram representation of vehicle control logic elements embodying the teachings of the present invention.

Refer now to FIG. 2 wherein a block diagram of the control device 5 is illustrated. A direction selector 11 serves as a means for providing a direction or carrier signal having a first frequency if the direction of travel for the vehicle is to be in a forward direction, and having a second frequency if the direction of travel for the vehicle is to be in the reverse direction. The signal output from the direction selector 11 is coupled to a first input 12 of a divider modulator 13 which functions as a means for providing a vehicle control signal to a vehicle operational in the system and is also provided to a speed code selector 14. The speed code selector 14 receives a plurality of coded speed signals from a speed code generator 15 and selects a given one of the speed codes as the speed code to be transmitted to the divider modulator 13, such that the device 13 may transmit the speed code to the vehicle operational in the system. The speed code selected by the speed code selector 14 is determined by the signal inputs from the wayside equipments as are illustrated in FIG. 1. The block 16 is illustrative of a composite representation of the wayside devices as illustrated in FIG. 1. The speed code generator 15 also transmits a bit rate signal via a line 17 to another input of the divider modulator 13. This signal, as will be explained in greater detail later, is used to shift the phase of the control signal output of the divider modulator 13 at bit rate determined by the speed code generator. The control signal output from the divider modulator 13, therefore, is a frequency modulated binary coded signal in which the order of the ONES and ZEROS are indicative of the speed at which the vehicle is to travel over the vehicle travel path, and the frequency of the respective binary ONE and binary ZERO signals determines the direction of travel of the vehicle. That is, if the vehicle is traveled in a forward direction, the binary ONE and ZERO signals are at first and second frequencies respectively, and if the vehicle is to travel in the reverse direction, the binary ONES and ZEROS signals are a third and fourth frequencies respectively. The detailed description of operation of the elements comprising the control device 5 follows.

Figure 3:
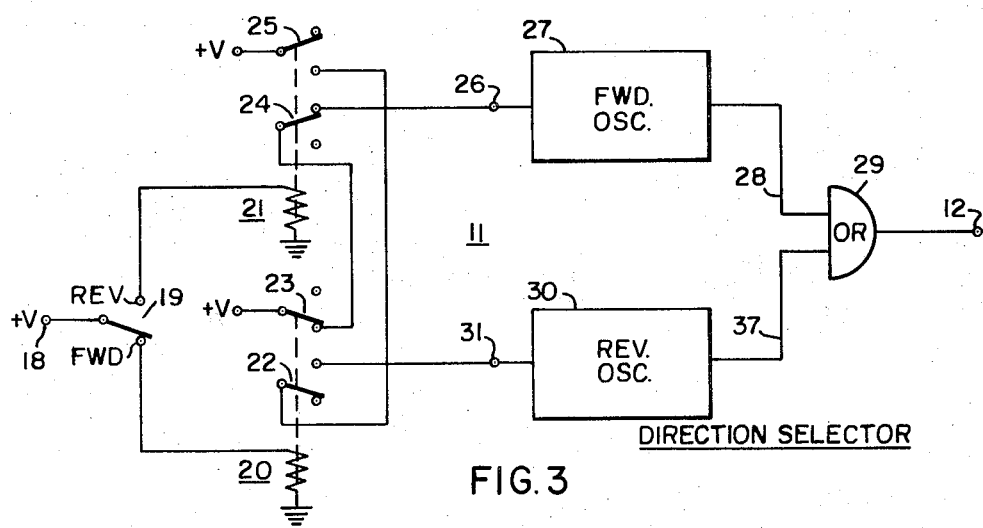
FIG. 3 is a schematic and block diagram representation of the direction selector illustrated in FIG. 2.

Refer now to FIG. 3, which is a schematic and block diagram representation of the direction selector 11 illustrated in FIG. 2. A source of operating potential +V is connected to a terminal 18 which in turn is connected to a switch 19 which is shown in a forward (FWD) position for energizing a relay 20. When the switch 19 is in the reverse (REV) position, the relay 21 is energized. The relay 20 has contacts 22 and 23, with the contact 23 being connected to a source of operating potential +V. The relay 20 is shown in the energized position. The relay 21 has contacts 24 and 25, with contact 25 being connected to a source of operating potential +V. The relay 21 is shown in the deenergized position. The contacts of the relays 20 and 21 are connected such that the relay combination functions as an exclusive OR circuit. When the switch 19 and the relays 20 and 21 are in the positions indicated the circuit functions as follows. The voltage +V is coupled via the switch 19 to the relay 20 for energizing the relay 20. The voltage +V is then applied to the contact 23 of energized relay 20, through the contact 24 of the denergized relay 21 to a power input terminal 26 of an oscillator 27, which is termed the forward oscillator. The oscillator 27 provides a signal output at a first frequency via a line 28 to a first input of an OR gate 29 and the resulting output signal from the OR gate 29 is applied to the input 12 of the divider modulator 13 illustrated in FIG. 2. It is seen that an oscillator 30 which is termed the reverse oscillator has no voltage applied to its input terminal 3 since relay 20 is energized. Therefore the oscillator 30 is in an OFF condition and provides no output signal to the gate 29. Assume that the switch 19 is now switched to the reverse position. The relay 20 therefore becomes deenergized and the relay 21 becomes energized. The voltage +V is then coupled through the contact 25 of energized relay 21, through contact 22 of the deenergized relay 20 to the input terminal 31 of the oscillator 30 which provides a carrier signal at a second frequency at its output via a line 37 to the other input of the OR gate 29 which then provides at its output a carrier or direction signal at a second frequency which in turn is applied to the input terminal 12 of the divider modulator 13. From the above it is readily seen that the relays 20 and 21 function as an exclusive OR circuit.

Assume for the moment that the relays 20 and 21 are simultaneously energized due to a circuit failure. The voltage +V is then conducted via the contact 23 of energized relay 20 to the contact 24 of the energized relay 21. There is, therefore, no connection to the power input terminal 26 of the forward oscillator 27 and accordingly no output signal via the line 28 to the OR circuit 29. The voltage +V is applied via the contact 25 of energized relay 21 to the contact 22 of the energized relay 20. It is seen therefore that no voltage signal is supplied to the terminal 31 of the oscillator 30 and therefore no signal is applied to the OR gate 29. It is seen therefore that no direction or carrier signal output is provided to the terminal 12 in the event both relays 20 and 21 are simultaneously energized. Likewise it may be seen that a carrier signal is not applied to the terminal 12 when the relays 20 and 21 are simultaneously deenergized. It is seen therefore that when the direction selector selects a forward direction of travel for the vehicle a direction or carrier signal having a first frequency is provided to the terminal 12, and when the direction selector determines that the vehicle should travel in the reverse direction a direction or carrier signal having a second frequency is applied to the terminal 12.

Figure 4:
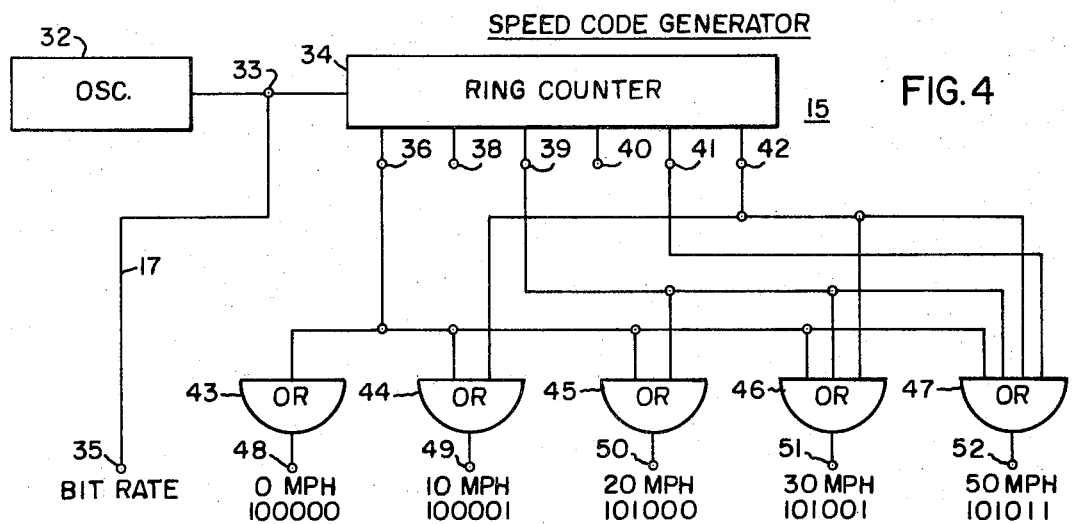
FIG. 4 is a block diagram representation of the speed code generator illustrated in FIG. 2.

Refer now to FIG. 4 which is a block diagram representation of the speed code generator 15 illustrated in FIG. 2. An oscillator 32 provides a periodic signal, for example at a 18 hertz rate, to an output terminal 33. The periodic signal is then applied to a ring counter 34 and a terminal 35 via line 17. The line 17, as was previously described, is connected to one of the inputs of the divider modulator 13 and the function of the latter signal will be described shortly. The ring counter 34 counts in response to the provided periodic input signal and provides signals at the outputs of its respective stages 36, 38, 39, 40, 41 and 42. The operation of a ring counter is well known in the art and therefore a detailed description of its operation will not be provided. A plurality of gates such as the OR gates 43, 44, 45, 46 and 47 are connected to the respective output stages of the ring counter 34. The signal output from each of the latter OR gates is a binary speed code which may or may not be transmitted to a given vehicle operational in the system dependent upon the presence or absence of other vehicles preceding the given vehicle along the vehicle travel path. The output from the gate 43 is termed a zero miles per hour (MPH) signal; the signal output from the OR gate 44 is termed a 10 MPH signal; the signal output from the OR gate 45 is termed a 20 MPH signal; the signal output from the OR gate 46 is termed a 30 MPH signal; and the output from the OR gate 47 is termed a 50 MPH signal. The binary code for each of the respective speed signals is shown below the respective output terminals 48, 49, 50, 51 and 52. It is readily apparent how these codes are derived by following the input connections to the respective OR gates from the output connections of the respective stages of the ring counter 34. The signal outputs from the respective gates are connected to inputs of the speed code selector 14 as will be described shortly.

Figure 5:
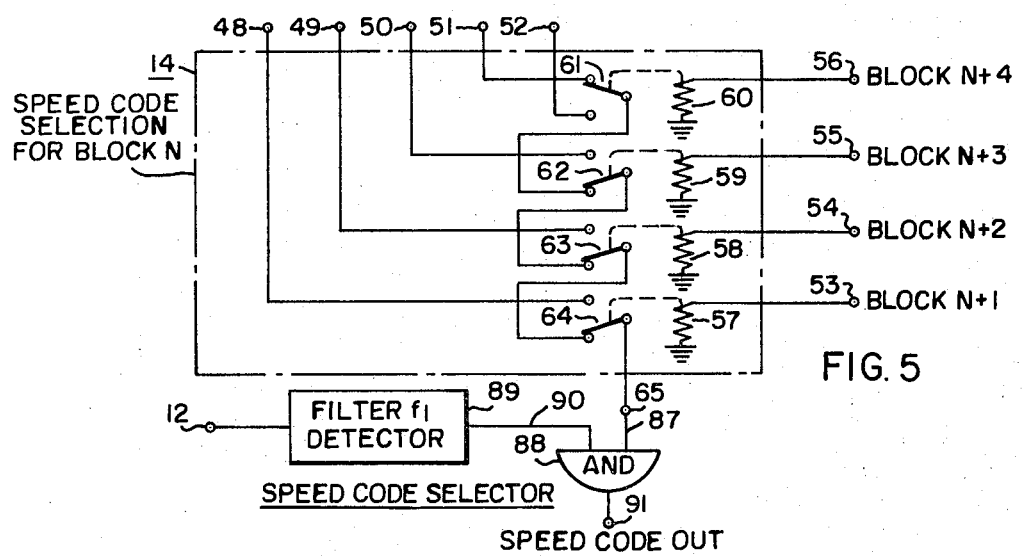
FIG. 5 is a schematic diagram representation of the speed code selector illustrated in FIG. 2.

Refer now to FIG. 5 which is a schematic diagram representation of the speed code selector 14 illustrated in FIG. 2. Block occupancy signals are transmitted from the wayside devices 7, 8, 9 and 10 as illustrated in FIG. 1, to the terminals 53, 54, 55 and 56, respectively, of the device 14. As was previously explained, a signal is supplied to an input terminal of the device 14 from the wayside device whenever the control block associated with the wayside device is absent a vehicle. Accordingly, when there is a vehicle present in the control block, the associated wayside device does not transmit a signal to the device 14. As was previously mentioned the device 16 in FIG. 2 is a composite showing of the wayside devices of FIG. 1. Assume the vehicle pattern on the vehicle travel path 2 is as illustrated in FIG. 1, that is, the vehicle 3 is present in block N and is the vehicle which is to receive the binary coded direction and speed signal. A vehicle 4 is present in the block N+4, and the intermediate control blocks are absent a vehicle. Returning to FIG. 5, it is seen therefore that terminals 53, 54 and 55 are receiving input signals from their associated wayside devices, whereas the terminal 56 is not receiving an input signal since the control block N+4 has a vehicle therein. Accordingly, the relays 57, 58 and 59 are energized whereas the relay 60 is deenergized. Therefore, a 30 MPH speed signal is coupled from the input terminal 51 through the contact 61 of deenergized relay 60, through the contact 62 of the energized relay 59, through the contact 63 of the energized relay 58, and the contact 64 of the energized relay 57 to an output terminal 65 and from there to an input of the divider modulator 13 as the selected speed code. It is seen that if the block N+4 is also absent a vehicle and accordingly a signal is applied to the relay 60 from block N+4, a 50 MPH speed signal is then conducted from the terminal 52 to the output terminal 65 as the selected speed code. If the block N+1 is occupied by a vehicle the relay 57 is deenergized and a 0 MPH speed signal is coupled from the terminal 48 through the contact 64 of the deenergized relay 57 to the output terminal 65 as the selected speed code. If the block N+2 is the only block having a vehicle therein the relay 58 is deenergized and a 10 MPH signal is coupled from the terminal 49 through the contact 63 of deenergized relay 58 through the contact 64 of the energized relay 57 to the output terminal 65 as the selected speed code. If the block N+3 is the only control block having a vehicle therein, the relay 59 is then deenergized and a 20 MPH speed signal is coupled from the terminal 50 through the contact 62 of the deenergized relay 59, through contact 63 of the energized relay 58, and through contact 64 of the energized relay 57 to the output terminal 65 as the selected speed code. It is seen therefore that an increasing speed signal is selected as there is an increased number of consecutive control blocks absent a vehicle ahead of the control block in which the vehicle to be controlled is present. The selected speed code manifested at terminal 65 is applied to a first input 87 of an AND gate 88. The direction signal from selector 11 is applied to a filter-detector 89 which is tuned to the first frequency F1. Therefore an enable signal is applied to a second input 90 of gate 88 only in the event a direction signal for travel in the first direction has been selected. In response thereto, the selected speed code is applied to a terminal 91 and in turn to the Divider Modulator 13. It is to be appreciated that a like logic network (not shown) is needed for selecting speed codes for the second or reverse direction.

Figure 6:
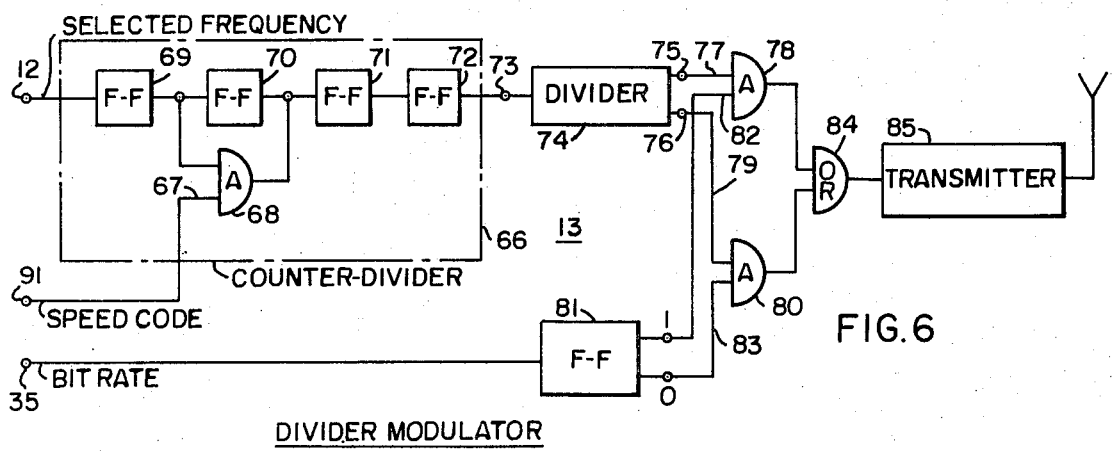
FIG. 6 is a block diagram representation of the divider modulator illustrated in FIG. 2.

Refer now to FIG. 6, which is a block diagram representation of the divider modulator 13 illustrated in FIG. 2. The direction or carrier signal from the output of the direction selector 11 is applied to the input terminal 12 of a counter divider 66. The selected speed code from the output terminal 91 of the speed code selector 14 is applied to a first input terminal 67 of an AND gate 68 which forms part of the counter divider 66. The counter divider 66 also includes a plurality of flip-flops 69, 70, 71 and 72 which form the respective stages of the counter divider. If the speed code signal applied to the first input 67 of the AND gate 68 is a binary ZERO level, the AND gate 68 is disabled and the four stages of the counter divider 66 function as a four-stage counter and the frequency N of the signal applied to terminal 12 is divided by 16. For example, if the direction signal is at a first frequency, for example, 80 kilohertz (khz) the signal manifested at the output terminal 73 of the counter 66 is 80 khz divided by 16 or 5 khz which is indicative of a binary ZERO bit in the speed code being applied to the input terminal 67 of the AND gate 68. On the other hand, if a binary ONE bit is present in the speed code and is applied to the input terminal 67 of the AND gate 68, it is seen that the flip-flop 70 is bypassed and the counter divider 66 functions as a three-stage counter and therefore the frequency N of the signal input is divided by 8. If the direction or carrier signal is at the first frequency, 80 khz this results in a frequency output signal of 10 khz being manifested at the output terminal 73 as the result of the binary ONE bit in the speed code being applied to the input 67 of the AND gate 68.

If the vehicle is commanded to travel in a reverse direction, the direction or carrier signal, for example, may have a frequency of 60 khz. In this instance, if a binary ZERO bit in the speed code is applied to the input 67 of the AND gate 68, a 3.75 khz signal is manifested at the output terminal 73, whereas if a binary ONE bit in the speed code is applied to the input 67 of the AND gate 68, a 7.50 khz signal is manifested at the output terminal 73. The signal appearing at the terminal 73 is then applied to the input of a divider 74 which, for example, may be another flip-flop. The flip-flop 74 may be omitted in the practice of the invention. In response to the latter signal input, the divider 74 alternately changes from one state to the other, thereby further dividing the frequency of the input signal by a factor of 2. Therefore, the signals appearing at the output terminals 75 and 76, respectively, are out of phase with one another and are at the following frequencies. If a forward direction or carrier signal is applied to the input terminal 12, that is, a signal of 80 khz the signals appearing at the respective outputs of the divider 74 will be at 5.0 khz if the bit in the binary speed code is at a binary ONE level, and if the bit is at a binary ZERO level, the output signal will be at 2.5 khz. If a reverse direction or carrier signal is applied to the terminal 12, that is, a signal of 60 khz the signals appearing at the respective outputs of the divider 74 will be a 3.75 khz if the bit in the binary speed code is a binary ONE level, and if the bit is at a binary ZERO level, the output signal will be at 1.875 khz. The output terminal 75 is coupled to a first input terminal 77 of an AND gate 78. The output terminal 76 is connected to a first input 79 of an AND gate 80. A flip-flop 81 has an input connected to the output terminal 35 of the speed code generator 15 and receives from there the bit rate signal which is at an 18 hertz rate. The one output terminal of the flip-flop 81 is connected to a second input terminal 82 of the AND gate 78 and the ZERO output terminal of flip-flop 81 is connected to a second input terminal 83 of the AND gate 80. It is seen, therefore, that for each pulse in the bit rate signal, the flip-flop 81 changes state alternately enabling the AND gates 78 and 80. The AND gates 78 and 80 are receiving the out of phase signals from the divider 74 at their other input terminals, therefore successive bits in the speed code signal alternately are provided at the respective outputs of the gates 78 and 80. Accordingly the carrier frequency representing successive bits alternately provided at the output of the gates is out of phase from one bit time to the next. Accordingly, the signal manifested at the output of the OR gate 84 is a frequency modulated binary coded direction and speed signal in which the direction signal is determined by the frequency of the ONE and ZERO signals in the code and the speed information is contained in the respective order of the binary ONE and ZERO bits. From one bit time to the next the phase of the output signal reverses. This is done so decoding equipment on the vehicle can differentiate between successive bit times. If a forward command signal is given, a binary ONE bit will be at 5 kilohertz and a binary ZERO will be at 2.5 kilohertz. If a reverse command is given, a binary ONE bit will be at 3.75 kilohertz and a binary ZERO will be at 1.875 kilohertz. The speed information is determined by the speed code selector as was previously explained. The OR gate 84 is connected to a transmitter 85 which in turn transmits the coded control signal containing direction and speed information to the vehicle 3 which is operational in the system. The vehicle control equipment on board the vehicle then decodes the coded control signal and travels in the direction and at the speed directed.

What is claimed is:

1. In a system for controlling the speed and direction of travel of a vehicle over a vehicle travel path, the combination comprising:
    means for providing a carrier signal having a first frequency if the direction of travel for said vehicle is to be in a forward direction, and having a second frequency if the direction of travel for said vehicle is to be in a reverse direction;
    means for providing a plurality of binary coded speed signals indicative of the different speeds at which said vehicle may travel over said vehicle travel path;
    means for selecting a given one of said plurality of binary coded speed signals as the desired speed signal for said vehicle; and
    means for providing a binary coded vehicle control signal for controlling the movement of said vehicle in response to the provision of said carrier signal and the selection of said given one of said plurality of binary coded speed signals, said vehicle control signal being coded such that the binary ONES and ZEROS are in the same order as the order of the binary ONES and ZEROS of said given one of said plurality of binary coded speed signals and are at third and fourth frequencies, respectively in response to said carrier signal having said first frequency, and are at fifth and sixth frequencies, respectively in response to said carrier signal having said second frequency.

2. A method of controlling the speed and direction of travel of a vehicle over a vehicle travel path, said method comprising the steps of:
    providing a direction signal having a first frequency if the direction of travel for said vehicle is to be in a forward direction, and having a second frequency if the direction of travel for said vehicle is to be in a reverse direction;
    providing a plurality of binary coded speed signals indicative of the different speeds at which said vehicle may travel over said vehicle travel path;
    selecting a given one of said plurality of binary coded speed signals as the desired speed signal for said vehicle; and
    providing a binary coded vehicle control signal for controlling the movement of said vehicle in response to the provision of said carrier signal and the selection of said given one of said plurality of binary coded speed signals, said vehicle control signal being coded such that the binary ONES and ZEROS are in the same order as the order of the binary ONES and ZEROS of said given one of said plurality of binary coded speed signals and are at third and fourth frequencies, respectively in response to said direction signal having said first frequency, and are at fifth and sixth frequencies, respectively in response to said direction signal having said second frequency.

3. In a system for controlling the speed and direction of travel of a vehicle over a vehicle travel path, the combination comprising:
    means for providing a first carrier signal;
    means for providing a second carrier signal;
    means for selecting said first carrier signal if said vehicle is to travel in one direction, and for selecting said second carrier signal if said vehicle is to travel in the opposite direction;

means for providing a plurality of binary coded speed signals indicative of the different speeds at which said vehicle may travel over said vehicle travel path;

means for selecting a given one of said plurality of binary coded speed signals as the desired speed signal for said vehicle;

means for providing a frequency and binary coded direction and speed signal for controlling the movement of said vehicle in response to the provision of the selected carrier signal and the selection of said given one of said plurality of vehicle control signals, said direction and speed signal being coded such that the order of the binary ONES and ZEROS are in the same order as the binary ONES and ZEROS in said given one of said plurality of binary coded speed signals and are at first and second frequencies respectively in response to the selection of said first carrier signal, and are at third and fourth frequencies respectively in response to the selection of said second carrier signal.

4. The combination claimed in claim 3 wherein the means for selecting said first carrier signal and said second carrier signal comprises an exclusive OR gate.

5. The combination claimed in claim 4 wherein said means for providing a frequency and binary coded direction and speed signal comprises a modulator.

* * * * *

UNITED STATES PATENT OFFICE
CERTIFICATE OF CORRECTION

PATENT NO. : 3,810,099
DATED : May 7, 1974
INVENTOR(S) : David H. Woods

It is certified that error appears in the above-identified patent and that said Letters Patent are hereby corrected as shown below:

In the claims, claim 2 column 8 line 47 change "carrier" to -- direction --.

Signed and Sealed this thirteenth Day of April 1976

[SEAL]

Attest:

RUTH C. MASON
Attesting Officer

C. MARSHALL DANN
Commissioner of Patents and Trademarks